United States Patent
Watari

[11] Patent Number: 5,123,696
[45] Date of Patent: Jun. 23, 1992

[54] REAR BODY STRUCTURE FOR AN AUTOMOTIVE VEHICLE

[75] Inventor: Tadayoshi Watari, Hiroshima, Japan

[73] Assignee: Mazda Motor Corporation, Hiroshima, Japan

[21] Appl. No.: 501,096

[22] Filed: Mar. 29, 1990

[30] Foreign Application Priority Data

Mar. 31, 1989 [JP] Japan ................................. 1-081722

[51] Int. Cl.$^5$ ............................................. B62D 25/08
[52] U.S. Cl. ..................................... 296/195; 296/30; 296/201
[58] Field of Search .............. 296/29, 30, 193, 195, 296/198, 201, 203

[56] References Cited

U.S. PATENT DOCUMENTS

| | | | |
|---|---|---|---|
| 3,661,419 | 5/1972 | Mitamura et al. | 296/195 X |
| 4,234,225 | 11/1980 | Harasaki et al. | 296/195 X |
| 4,408,794 | 10/1983 | Harasaki | 296/195 X |
| 4,634,174 | 1/1987 | Kamiya | 296/195 |
| 4,875,733 | 10/1989 | Chado et al. | 296/195 |

FOREIGN PATENT DOCUMENTS

| | | | |
|---|---|---|---|
| 145078 | 9/1986 | Japan . | |
| 253268 | 11/1986 | Japan | 296/195 |
| 83251 | 4/1987 | Japan | 296/195 |
| 28709 | 8/1988 | Japan . | |

*Primary Examiner*—Margaret A. Focarino
*Assistant Examiner*—Andrew C. Pike
*Attorney, Agent, or Firm*—Fish & Richardson

[57] ABSTRACT

A rear body structure for an automotive vehicle has a rear pillar with a rear pillar inner panel and a rear pillar reinforcement. The rear pillar reinforcement forms a closed cross section with the pillar inner panel. The rear body structure also has a rear window lower frame which has a closed cross section and which extends transversely to support a lower end portion of a rear window and a rear shelf member which has an open cross section and which has a horizontal plate portion forming a shelf. The rear pillar reinforcement is connected to the rear window lower frame at the rear end thereof and is connected to the rear shelf member at the front end thereof.

21 Claims, 7 Drawing Sheets

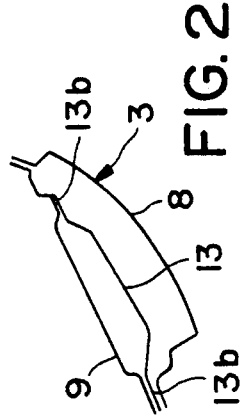
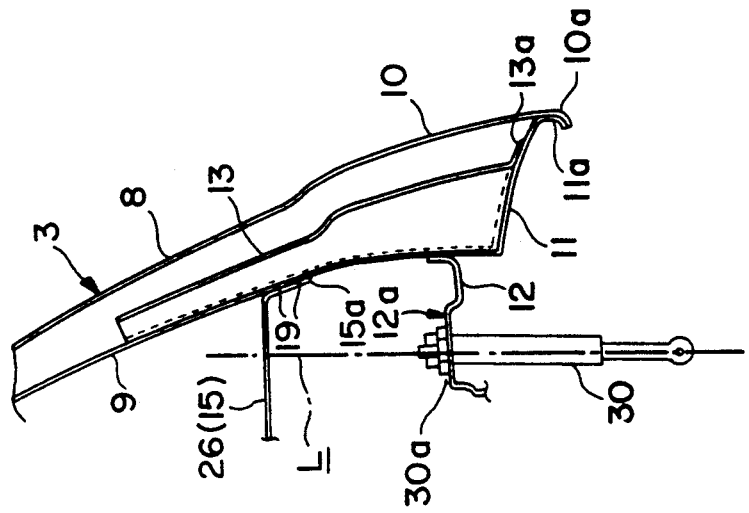
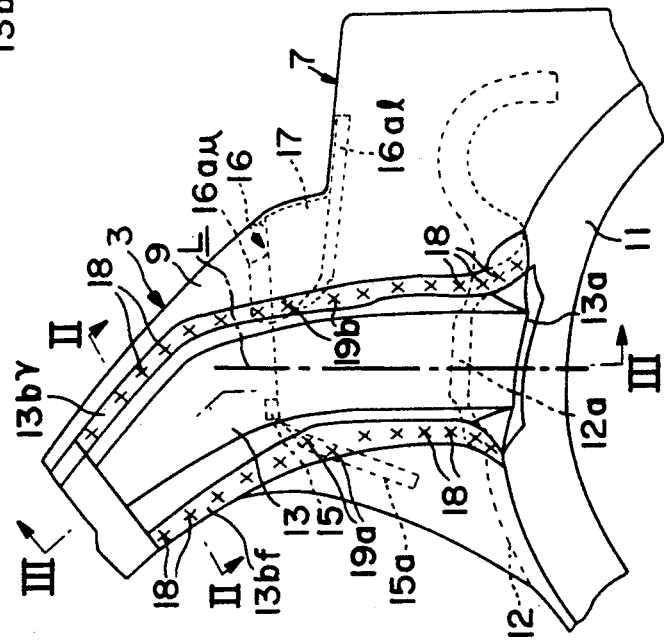

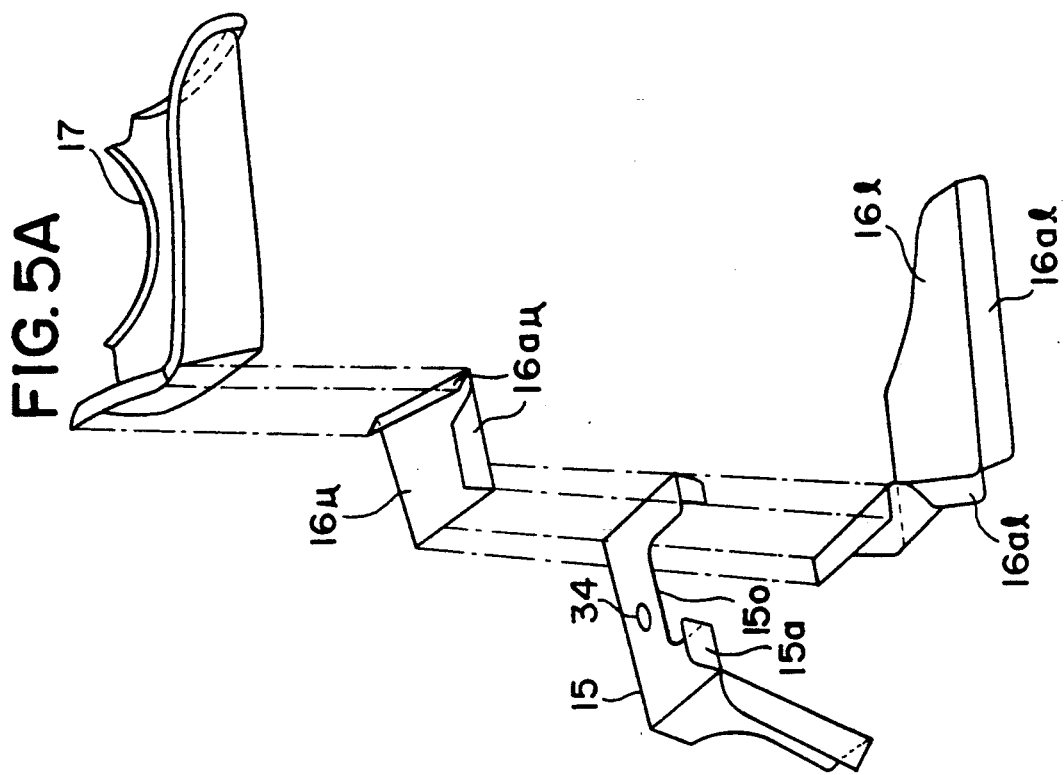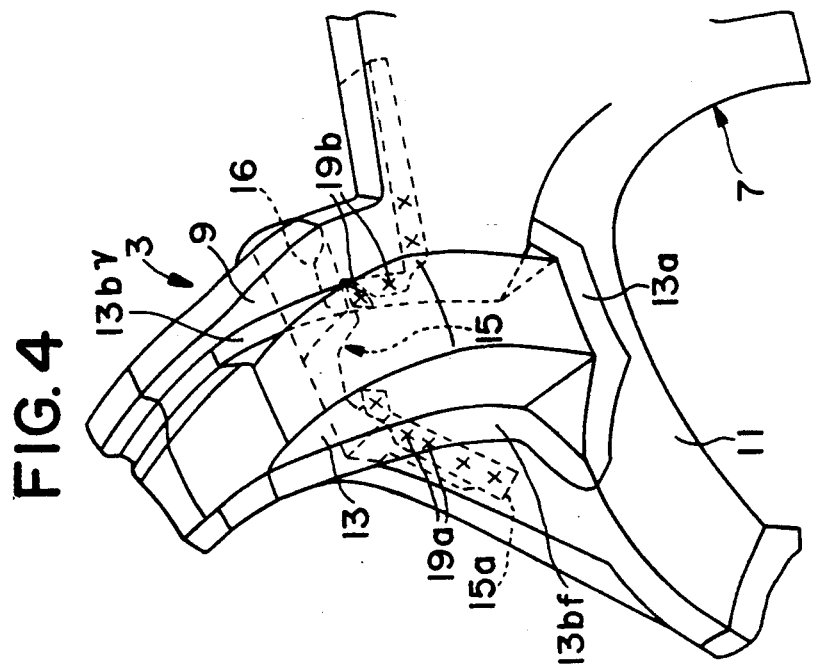

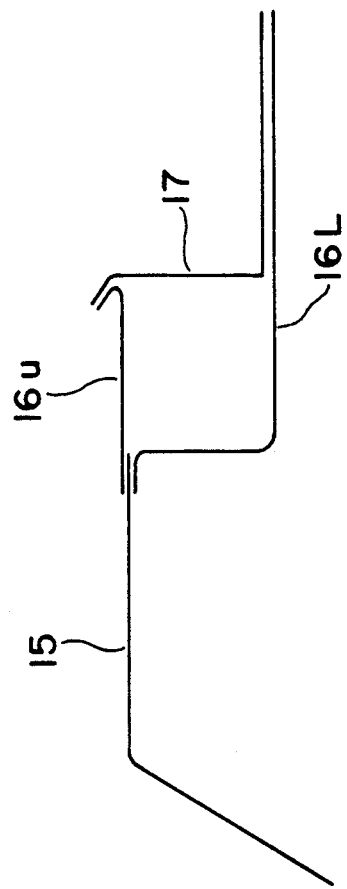

REAR BODY STRUCTURE FOR AN AUTOMOTIVE VEHICLE

BACKGROUND OF THE INVENTION

1. Field of the Invention

This invention relates to a rear body structure for an automotive vehicle.

2. Description of the Prior Art

In a conventional rear body structure for an automotive vehicle, it has been proposed that a rear pillar be reinforced by a rear pillar reinforcement which forms a closed cross section with a pillar inner panel (for example, Japanese Utility Model Laid-open Application No. 61-145078).

In such a rear body structure, the rear pillar reinforcement can receive the reaction force from the rear suspension. However, the rear pillar reinforcement needs to have sufficient length in order to effectively receive the reaction force from the rear suspension. This will result in increased production cost. In addition, in a case where the rear pillar inclines forwardly, this rear suspension reinforcement may be less effective because of its inclination angle.

Japanese Utility Model No. 63-28709 also discloses a rear pillar reinforcement which is almost the same structure as Japanese Utility Model Laid-open Application No. 61-145708. But, this rear pillar reinforcement is connected with an arch-shaped box-like closed cross-section member including a rear bulkhead, a rear panel and a reinforcement. This arch-shaped box-like closed cross section structure has the disadvantage that installation of the rear suspension is difficult because the arch-shaped box-like closed cross section structure blocks the worker's access.

SUMMARY OF THE INVENTION

Therefore, an object of the present invention is to provide a rear body structure for an automotive vehicle capable of reinforcing a rear pillar portion effectively.

For the above purpose, this invention is accomplished by providing a rear body structure comprising a rear pillar including a rear pillar inner panel, a rear pillar reinforcement which forms a closed cross section with the pillar inner panel and a rear window lower frame which has a closed cross section and which extends transversely to support a lower end portion of a rear window, the rear pillar reinforcement being connected with the rear window lower frame.

In accordance with such an arrangement, the reaction force of the rear suspension is transmitted to the rear window lower frame through the rear pillar inner panel and the rear pillar reinforcement. Since the rear window lower frame is of closed cross section, it has a large stiffness to receive the reaction force from the rear suspension.

By connecting the rear pillar reinforcement to the rear window lower frame, the rear window lower frame can counteract the reaction force from the rear suspension in addition to supporting the rear windshield glass. Therefore, this invention provides an effective reinforcing structure for receiving the reaction force from the rear suspension by using an element which simultaneously performs another function. Accordingly, the structure of this invention does not require special or additional reinforcement members to increase stiffness. Thus the invention results in cost reduction, vehicle weight reduction and construction man-power reduction.

A further object of the present invention is to provide a rear body structure for an automotive vehicle which is capable of reinforcing a rear pillar portion effectively without hindering installation of the rear suspension.

For the above purpose, this invention is accomplished by providing a rear body structure comprising a rear pillar including a rear pillar inner panel, a rear pillar reinforcement which forms a closed cross section with the pillar inner panel, a rear window lower frame which has a closed cross section and which extends transversely to support a lower end portion of a rear window, and a rear shelf member which has an open cross section and consists of at least a horizontal plate portion for providing a shelf, the rear pillar reinforcement being connected with the rear window lower shelf member at front end thereof.

In accordance with such an arrangement, the reaction force of the rear suspension is transmitted to both of the rear window lower frame and the rear shelf member through the rear pillar inner panel and the rear pillar reinforcement. Since the rear window lower frame is of a closed cross section, it has a large stiffness to receive the reaction force from the rear suspension.

The reaction force from the rear suspension can be received most effectively by connecting the rear pillar reinforcement with the rear window lower frame at the rear end thereof, because the axis of the damper strut in the rear suspension passes near to or in front of the rear window lower frame. The rear pillar reinforcement, which is normally inclined or bent forward, can be supported from the rearward direction. Such a structure can improve the load balance placed on the rear pillar reinforcement.

By connecting the rear pillar reinforcement to the rear window lower frame, the rear window lower frame can counteract the reaction force from the rear suspension in addition to supporting the rear windshield glass. Therefore, this invention provides an effective reinforcing structure for receiving the reaction force from the rear suspension by using an element which simultaneously performs another function. Accordingly, the structure of this invention does not require special or additional reinforcement members to increase stiffness. Thus the invention results in cost reduction, vehicle weight reduction and construction man-power reduction.

By connecting the front end of the rear pillar reinforcement to the rear shelf member, the reaction force can be also received by the rear shelf member. This configuration increases the stiffness of the reinforcement structure so that the vertical length of the rear pillar reinforcement can be reduced. A reduction in cost also results. Furthermore, since the rear shelf member is of an open cross section configuration, a large space under the rear shelf member can be utilized as a working space for installing the rear suspension.

The above and other objects and features of the present invention will become apparent from the following description of a preferred embodiment with reference to the accompanying drawings.

BRIEF DESCRIPTION OF THE DRAWINGS

FIG. 1 is a view showing a rear pillar reinforcement connected with a rear pillar inner panel and other reinforcement members;

FIG. 2 is a cross sectional view taken along a line II—II of FIG. 1;

FIG. 3 is a cross sectional view taken along a line III—III of FIG. 1;

FIG. 4 is a perspective view showing a rear pillar reinforcement connected with the rear pillar inner panel and other reinforcement members;

FIG. 5A is an exploded view showing the parts constituting a junction portion between the rear pillar and a rear window lower frame;

FIG. 5B is a vertical cross-sectional assembled view of the parts shown in FIG. 5A;

DETAILED DESCRIPTION OF THE INVENTION

Figure 12:
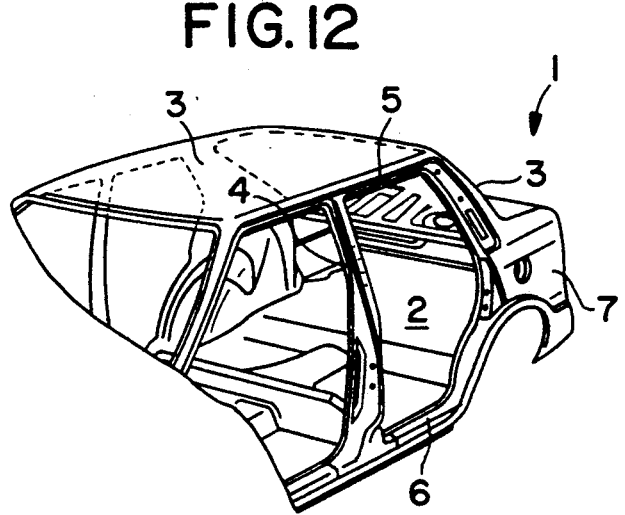
FIG. 12 is a schematic view showing a rear body structure of the automotive vehicle.

Referring to FIG. 12, a vehicle body 1 has an opening 2 for a rear side door at a rear side thereof, and this opening 2 has a rear end constructed by a rear pillar 3.

A front end of the opening 2 is constructed by a center pillar 4. An upper end of the opening 2 is constructed by a roof side rail 5. A lower end of the opening 2 is constructed by a side sill 6. A lower portion of the rear pillar 3 and rear end of the side sill 6 merge to a rear fender portion 7.

Referring now to FIGS. 1 to 8, the rear pillar 3 has a closed cross section consisting of a rear pillar outer panel 8 and a rear pillar inner panel 9.

The lower portion of the rear pillar outer panel 8 is connected to or integrally formed with a rear fender panel 10 which forms an outer surface of the rear fender portion 7. The other lower portion of the rear pillar inner panel 9 is connected to or integrally formed with a wheel housing 11. The lower end 10a of the rear fender panel 10 and the outer end 11a of the wheel housing 11 are connected to each other. Inside the wheel housing 11, there is provided an inner wheel housing 12 having a suspension tower portion 12a which supports an upper end 30a of a strut 30 included in a rear suspension element.

Inside the lower part of the rear pillar 3, there is provided a rear pillar reinforcement 13 which forms a closed cross section with the rear pillar inner panel 9. The lower end 13a of the rear pillar reinforcement 13 is connected with the wheel housing 11. The upper end of the rear pillar reinforcement 13 terminates at an intermediate portion of the pillar 3.

The left and right rear pillars 3 are connected through a rear window lower frame 14. The rear window lower frame 14 forms a closed cross section with rear shelf member 26. A junction portion between a rear pillar 3 and the rear window lower frame 14 is realized with a package junction 15 which is connected to a rear package tray 26, a rear window lower frame junction 16 which is connected to the rear window lower frame 14, and a corner plate 17 which is connected to the rear side of the rear window lower frame junction 16. The rear window lower frame junction 16 consists of two parts, namely a rear window lower frame junction upper member 16u and a rear window lower frame junction lower member 16l.

The rear pillar reinforcement 13 has a front connecting flange 13bf and a rear connecting flange 13br both of which are connected to the rear pillar inner 9 by spot welding 18. In addition, the rear pillar reinforcement 13 is connected to a connecting flange 15a of the package junction 15 by spot welding 19a. Furthermore, the rear pillar reinforcement 13 is connected to a connecting flange 16au of the rear window lower frame junction upper member 16u and a connecting flange 16al of the rear window lower frame junction lower member 16l by a spot welding 19b.

In FIGS. 1 and 3 line L shows the axis of the strut 30. The axis of strut 30 passes in front of the rear window lower frame 14 (or the rear window lower frame junction 16).

Figure 6:
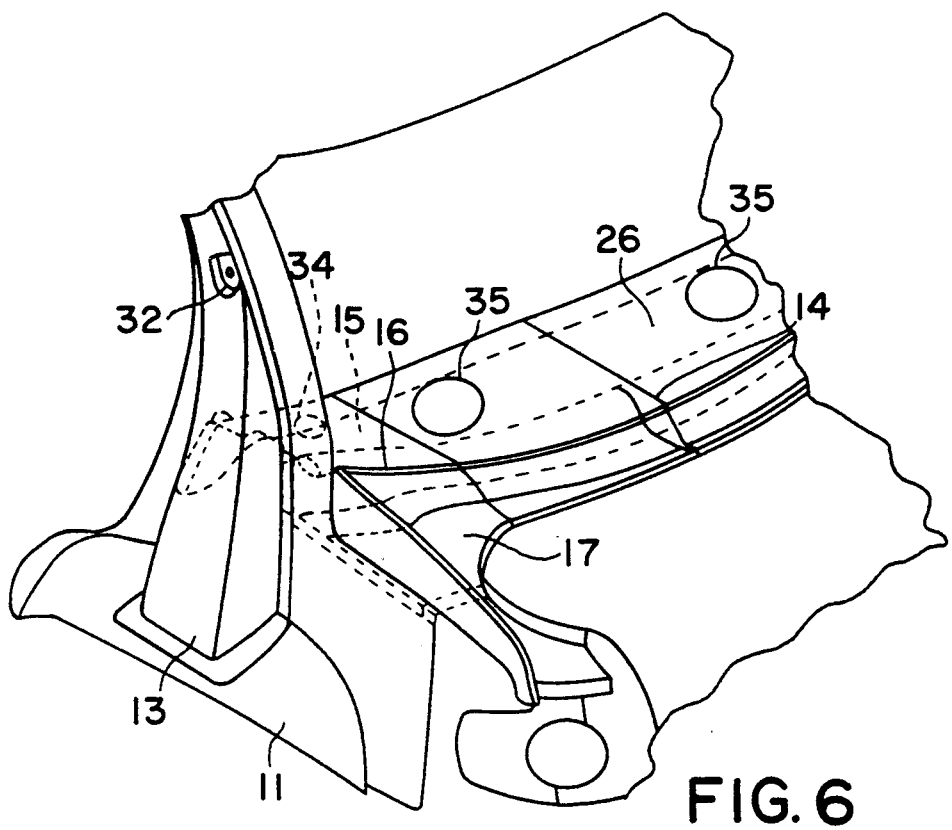
FIG. 6 is a perspective view showing the rear window lower frame and surrounding structures seen from the left rear side.
Figure 7:
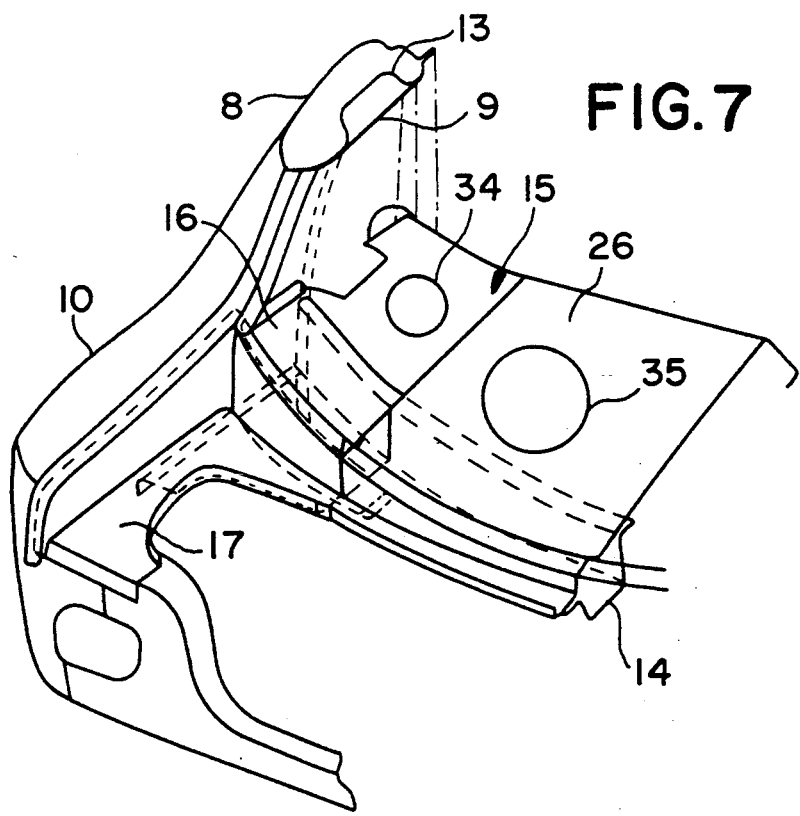
FIG. 7 is a perspective view showing the rear window lower frame and surrounding structures seen from the right rear side.
Figure 8:
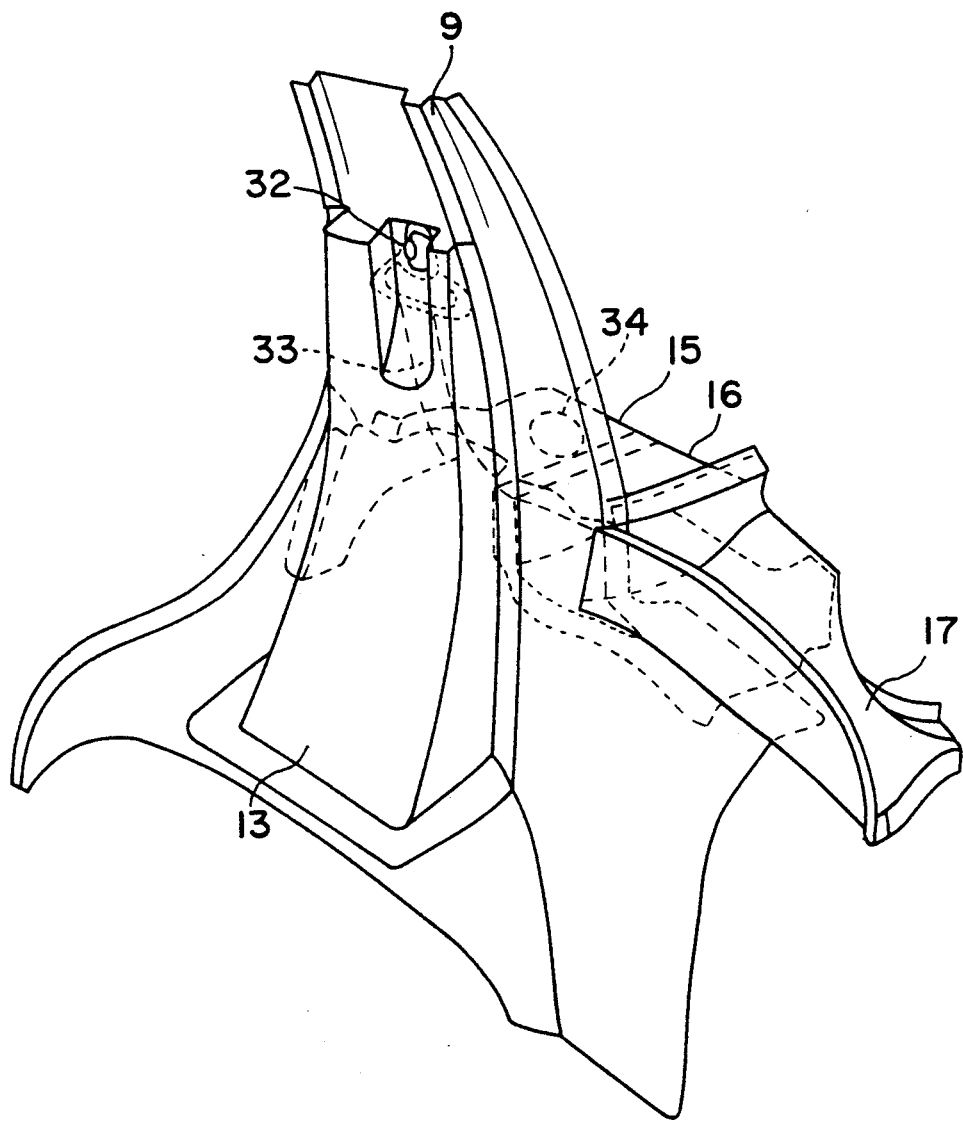
FIG. 8 is a perspective view showing a rear pillar similar to FIG. 4 but including a corner plate and a seat belt.

By this arrangement, the reaction force from the rear suspension is transmitted through the inner wheel housing 12 to the closed cross section structure consisting of the rear pillar inner panel 9, the wheel housing 11, and the rear pillar reinforcement 13. Consequently, the reaction force is transmitted to rear window lower frame 14, which forms a closed cross section with rear shelf member 26 as shown in FIG. 6.

Numeral 32 denotes an anchor portion of seat belt 33. Numeral 34 denotes a working hole for installing the rear suspension strut 30. Numeral 35 denotes holes for attaching audio speakers. The package junction 15 has a cutout 150 (depicted in FIG. 5A) which provides a passage for the seat belt 33.

Figure 9:
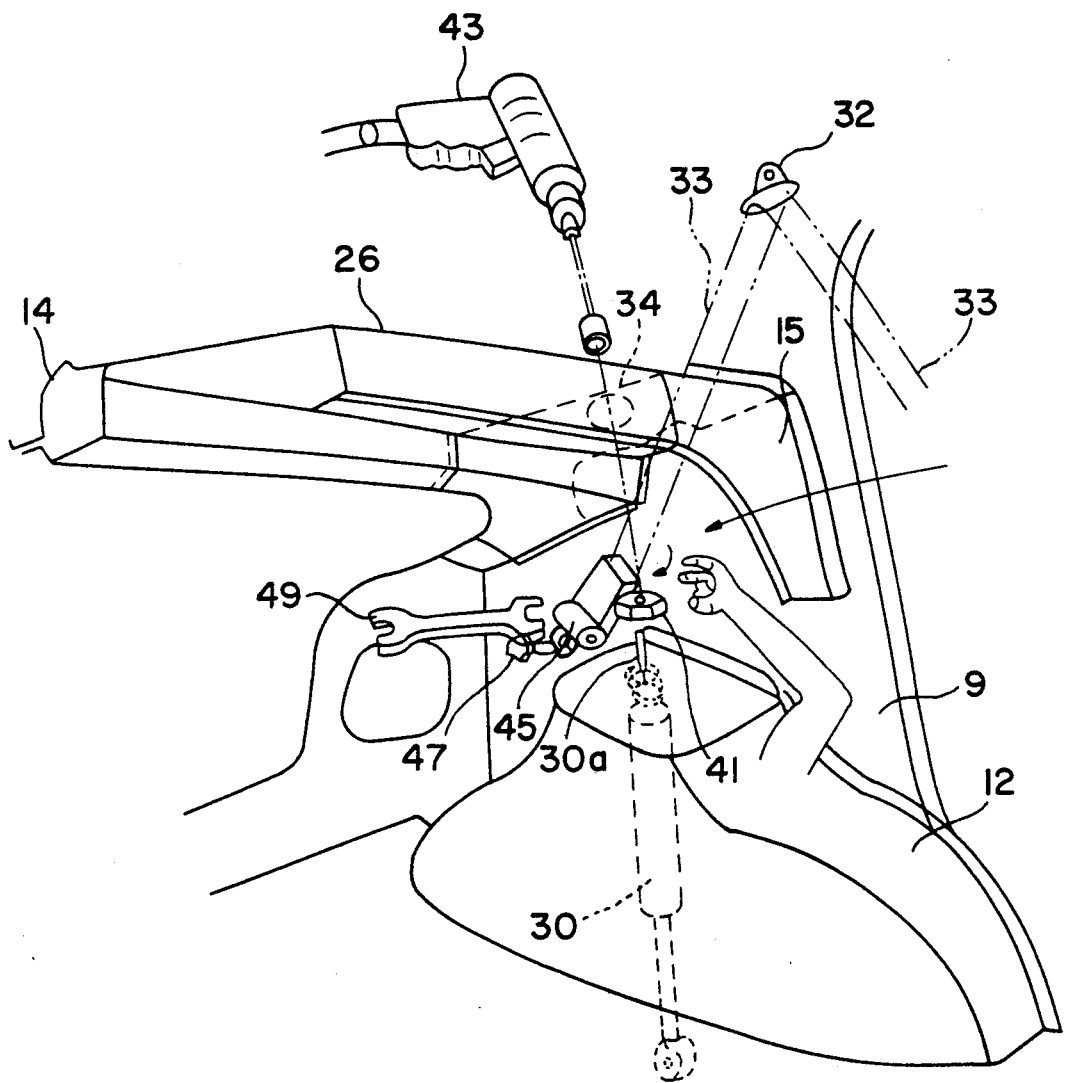
FIG. 9 is an illustrative view showing installation of the rear suspension.

Referring now to FIG. 9, installation of the strut 30 is explained. The worker puts a bolt 41 on the upper end 30a of the strut 30 and tightens the bolt 41 with an impact wrench 43. The impact wrench 43 is inserted into the working hole 34 on the package junction 15 above the strut 30. Since the package junction 15 and the package tray 26 have open cross sections, the worker has enough space to work between the inner wheel housing 12, the package junction 15, and the package tray 26.

Numeral 45 denotes a seat belt retractor. Numeral 47 denotes a bolt for fixing the seat belt retractor 45. Numeral 49 shows a spanner for screwing the bolt 47. Installation of the seat belt retractor 45 is also carried out in the same working space as the strut 30. Accordingly installation of both the strut 30 and of the seat belt retractor 45 is facilitated.

Figure 10:
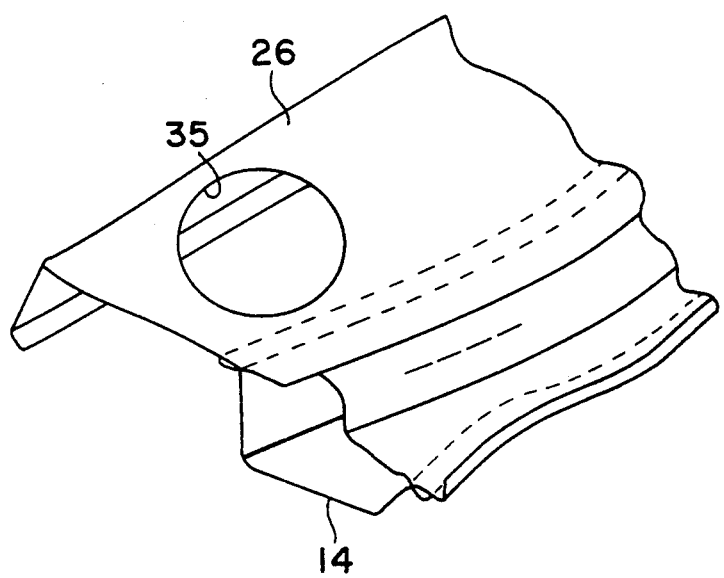
FIG. 10 is a view showing a rear package tray and the rear window lower frame.
Figure 11:
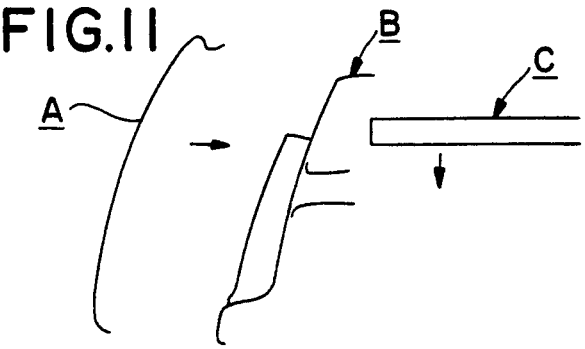
FIG. 11 is an illustrative view showing the assembling rear body members.

FIG. 10 shows the assembly of the package tray 26 and the rear window lower frame 14. As shown in FIG. 11, when the members of the rear body are installed, a rear fender assembly A including the rear pillar outer panel and the rear fender panel is connected with a rear pillar assembly B including the rear pillar inner panel and the rear pillar reinforcement. In addition, a package tray assembly C including the package tray and the rear window lower frame is connected with the rear pillar assembly B.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A rear body structure for an automotive vehicle comprising:
   two rear pillars each having a rear pillar inner panel;
   a rear pillar reinforcement for each pillar which forms a closed cross section with each rear pillar inner panel; and
   a rear window lower frame member which forms a closed cross section with a rear shelf member and which extends transversely between the two rear pillars to support a lower end portion of a rear window;
   wherein said rear pillar reinforcements are connected to the rear window lower frame member;
   said rear window lower frame member comprises a rear window lower frame extending transversely between the two rear pillars, and rear window lower frame junction means for connecting the rear window lower frame to the rear pillars; and
   said rear window lower frame junction means comprises an upper frame and a lower frame, and said upper frame and said lower frame form a closed cross section with a corner plate which is disposed at a rear side of the rear window lower frame junction means.

2. The rear body structure as claimed in claim 1, wherein a lower end of each rear pillar reinforcement is connected to a rear wheel housing.

3. The rear body structure as claimed in claim 2, wherein an upper end of each rear pillar reinforcement terminates at an intermediate portion of each said rear pillar.

4. The rear body structure as claimed in claim 3, wherein each rear pillar reinforcement is inclined in a forward direction.

5. The rear body structure as claimed in claim 4, wherein the rear window lower frame member is disposed substantially behind the rear pillar reinforcement.

6. A rear body structure for an automotive vehicle comprising:
   at least one rear pillar having a rear pillar inner panel;
   a rear pillar reinforcement which forms a closed cross section with the rear pillar inner panel;
   a rear window lower frame member which extends transversely to support a lower end portion of a rear window; and
   a rear shelf member having an open cross section and comprising a horizontal plate portion, wherein the rear window lower frame member forms a closed cross section with the rear shelf member;
   wherein at least a portion of said rear shelf member is disposed in front of the rear window lower frame member; and
   wherein said rear pillar reinforcement is directly connected to the rear window lower frame member at a rear end thereof and to said rear shelf member at a front end thereof.

7. The rear body structure as claimed in claim 6, wherein a rear suspension is located under the rear shelf member.

8. The rear body structure as claimed in claim 7, wherein the rear suspension comprises a strut, wherein a top portion of said strut is supported by a rear wheel housing disposed beneath said rear shelf member, and wherein a longitudinal axis of said strut passes through the rear shelf member.

9. The rear body structure as claimed in claim 8, wherein the rear shelf member has a working hole for installing the strut.

10. The rear body structure as claimed in claim 9, wherein the rear shelf member is located at a distance above the rear wheel housing so as to make a working space between the rear shelf member and the rear wheel housing.

11. The rear body structure as claimed in claim 6, wherein a seat belt retractor is located under the rear shelf member.

12. The rear body structure as claimed in claim 11, wherein the rear shelf member has a seat belt hole near the rear pillar for a seat belt.

13. The rear body structure as claimed in claim 12, wherein the rear shelf member is located at a distance above a rear wheel housing so as to make a working space between the rear shelf member and the rear wheel housing, and wherein the seat belt retractor is located in the working space.

14. The rear body structure as claimed in claim 6, comprising two said rear pillars, wherein the rear window lower frame member comprises a rear window lower frame extending transversely between the two rear pillars, and rear window lower frame junction means for connecting the rear window lower frame to the two rear pillars.

15. The rear body structure as claimed in claim 14, wherein the rear window lower frame junction means comprises an upper frame and a lower frame, and wherein said upper frame and said lower frame form a closed cross section with a corner plate which is disposed at a rear side of the rear window lower frame junction means.

16. The rear body structure as claimed in claim 6, wherein a lower end of the rear pillar reinforcement is connected to a rear wheel housing.

17. The rear body structure as claimed in claim 16, wherein an upper end of the rear pillar reinforcement terminates at an intermediate portion of said at least one rear pillar.

18. The rear body structure as claimed in claim 17, wherein the rear pillar reinforcement is inclined in a forward direction.

19. The rear body structure as claimed in claim 18, wherein the rear window lower frame member is disposed substantially behind the rear pillar reinforcement.

20. A rear body structure for an automotive vehicle having a rear suspension, said structure comprising:
   at least one rear pillar having a rear pillar inner panel;
   p1 a rear pillar reinforcement which forms a closed cross section with the rear pillar inner panel so as to receive reaction force from a rear suspension;
   a rear window lower frame member which extends transversely to support a lower end portion of a rear window; and
   a rear shelf member, at least a portion of which is disposed in front of the rear window lower frame member so that a longitudinal axis of a strut of the rear suspension passes in front of the rear window lower frame member, and a working space which is accessible when a top portion of the strut is fixed from an inside of the vehicle is provided under the rear shelf member, wherein the rear window lower frame member forms a closed cross section with the rear shelf member;

wherein said rear pillar reinforcement is welded to the rear window lower frame member at a rear end thereof and to said rear shelf member at a front end thereof.

21. A rear body structure for an automotive vehicle comprising:

at least one rear pillar having a rear pillar inner panel;

a rear pillar reinforcement which forms a closed cross section with the rear pillar inner panel; and a rear window lower frame member which forms a closed cross section with a rear shelf member and which extends transversely to support a lower end portion of a rear window;

wherein said rear pillar reinforcement is inclined forwardly and the rear window lower frame member is connected to the rear pillar reinforcement so that the rear window lower frame member is offset rearwardly against said rear pillar reinforcement.

* * * * *